United States Patent
Weiss et al.

(10) Patent No.: US 9,521,543 B2
(45) Date of Patent: Dec. 13, 2016

(54) METHODS AND DEVICES FOR OTA SUBSCRIPTION MANAGEMENT

(71) Applicant: GIESECKE & DEVRIENT GMBH, Munich (DE)

(72) Inventors: Dieter Weiss, Munich (DE); Klaus Vedder, Kranzberg (DE); Michael Meyer, Sankt Wolfgang (DE); Michael Tagscherer, Munich (DE); Jens Rudolph, Munich (DE); Ulrich Dietz, Munich (DE); Jari Nyholm, San Jose, CA (US); Thomas Larsson, Alvsjo (SE); Jorgen Hult, Tullinge (SE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 14/654,073

(22) PCT Filed: Dec. 17, 2013

(86) PCT No.: PCT/EP2013/003813
§ 371 (c)(1),
(2) Date: Jun. 19, 2015

(87) PCT Pub. No.: WO2014/095040
PCT Pub. Date: Jun. 26, 2014

(65) Prior Publication Data
US 2015/0350881 A1    Dec. 3, 2015

(30) Foreign Application Priority Data
Dec. 21, 2012    (EP) ................................... 12008581

(51) Int. Cl.
| | | |
|---|---|---|
| H04W 8/20 | (2009.01) | |
| H04B 1/38 | (2015.01) | |
| H04W 12/06 | (2009.01) | |
| H04W 4/00 | (2009.01) | |
| H04W 8/24 | (2009.01) | |
| H04W 84/04 | (2009.01) | |

(Continued)

(52) U.S. Cl.
CPC ........... *H04W 8/205* (2013.01); *H04B 1/3816* (2013.01); *H04W 4/001* (2013.01); *H04W 8/24* (2013.01); *H04W 12/04* (2013.01); *H04W 12/06* (2013.01); *H04W 84/042* (2013.01)

(58) Field of Classification Search
CPC ........ H04W 8/205; H04W 12/06; H04W 8/24; H04W 12/04; H04W 4/001; H04W 84/042; H04B 1/3816
See application file for complete search history.

(56) References Cited

U.S. PATENT DOCUMENTS

| | | | | |
|---|---|---|---|---|
| 8,417,231 B2* | 4/2013 | Sanding | ................ | H04W 8/183 455/418 |
| 8,626,165 B1* | 1/2014 | Narasimhan | .......... | H04W 36/14 370/252 |

(Continued)

FOREIGN PATENT DOCUMENTS

EP    2448298 A1    5/2012

OTHER PUBLICATIONS

Barriga et al., "M2M Remote-Subscription Management," URL:http://www.ericsson.com/res/thecompany/docs/publications/ericsson_review/2011/m2m_remotesubscriptions.pdf, May 2, 2011, pp. 1-6.
European Search Report for corresponding European Application No. 12008581.6, May 27, 2013.

(Continued)

*Primary Examiner* — Brandon Miller
(74) *Attorney, Agent, or Firm* — Workman Nydegger

(57) ABSTRACT

A method of providing a secure element of a mobile terminal with a subscription profile in which the mobile terminal is configured to communicate with a cellular communications network and the subscription profile comprises a network specific portion related to the cellular communications net- (Continued)

work or a different cellular communications network as well as a hardware specific portion related to the hardware of the mobile terminal and/or the secure element. The method comprises the steps of: assembling the subscription profile, wherein the network specific portion of the subscription profile is provided by a first server and the hardware specific portion of the subscription profile is provided by a second server; and providing the subscription profile over-the-air to the secure element. A corresponding secure element, mobile terminal and subscription management backend system involves features of the method.

16 Claims, 2 Drawing Sheets

(51) Int. Cl.
*H04B 1/3816* (2015.01)
*H04W 12/04* (2009.01)

(56) References Cited

U.S. PATENT DOCUMENTS

| 2009/0191857 | A1  | 7/2009  | Horn et al. |
| 2009/0318125 | A1* | 12/2009 | Normark ............... H04L 67/125 455/419 |
| 2010/0203864 | A1* | 8/2010  | Howard ............... H04W 12/04 455/411 |
| 2012/0144201 | A1* | 6/2012  | Anantha ............... H04L 9/0897 713/172 |
| 2013/0157673 | A1* | 6/2013  | Brusilovsky .......... H04W 8/205 455/450 |
| 2015/0280765 | A1* | 10/2015 | Lowery ................... H04W 8/22 455/558 |

OTHER PUBLICATIONS

International Search Report for corresponding International PCT Application No. PCT/EP2013/003813, Jan. 22, 2014.

* cited by examiner

METHODS AND DEVICES FOR OTA SUBSCRIPTION MANAGEMENT

FIELD OF THE INVENTION

The invention relates to mobile communications in general and in particular to methods and devices for over-the-air (OTA) subscription management of mobile terminals comprising a secure element, such as a subscriber identity module (SIM), an eUICC/UICC or the like.

BACKGROUND OF THE INVENTION

Communicating by means of a mobile terminal, such as a mobile phone, via a public land mobile network (PLMN; also referred to as a mobile or cellular communications network herein) operated by a mobile network operator (MNO) generally requires the mobile terminal to be equipped with a secure element for securely storing data uniquely identifying the user of the mobile terminal (also called subscriber). For instance, in the context of a mobile terminal configured to communicate according to the Global System for Mobile Communications (GSM), currently the world's most popular standard for mobile communications systems, the secure element is called a subscriber identity module (SIM) and is usually provided in the form of a smart card. According to the GSM standard, the technical features of which are defined by a large number of interrelated and mutually dependent specifications published by the ETSI standardization organization, the SIM contains subscription credentials for authenticating and identifying the user of the mobile terminal, including in particular an International Mobile Subscriber Identity (IMSI) and an authentication key $K_i$. These subscription credentials are generally stored on the SIM by the SIM manufacturer/vendor or the MNO during a SIM personalization process prior to providing the user of the mobile terminal with his SIM. A non-personalized SIM is generally not suited for use in a mobile terminal, i.e. the use of the services provided by a PLMN with a non-personalized SIM without the necessary subscription credentials is not possible.

One particular field of application of secure elements, such as SIMs, eUICCs, UICCs and the like, which is expected to grow rapidly in the near future is M2M (machine-to-machine) communication, i.e. the communication between machines over a cellular communications network without human intervention, also called the Internet of things. In M2M communication data is automatically transmitted between many different types of machines equipped with a secure element in the form of a M2M module, such as TV systems, set top boxes, vending machines, vehicles, traffic lights, surveillance cameras, sensor devices, and the like. It is foreseeable that at least for some of these devices it will not be possible or at least very difficult to provide the secure element beforehand with the necessary subscription credentials, including for instance an IMSI. This is because in a lot of M2M devices the secure element will most likely be implemented in the form of a surface mounted chip or chip module without the possibility of providing the secure element with the necessary subscription credentials beforehand. Consequently, once in the field, these M2M devices and their non-personalized secure elements require the provision of subscription credentials over-the-air.

When using the services provided by a MNO, in particular communicating via the PLMN provided by the MNO, the user of a mobile terminal is usually charged a certain monthly fee by the MNO. If the mobile user wants, for instance due to a lower monthly charge and/or superior services, to change to a different MNO, he generally has to manually replace the SIM provided by the current MNO and containing, in particular, the subscription credentials necessary for attaching to the PLMN of the current MNO by the SIM provided by the new MNO and containing the subscription credentials necessary for attaching to the PLMN of the new MNO. Certainly, it would be easier for the user, if instead of this conventional process of switching to a new MNO by manually replacing the SIM it would be possible to use one and the same secure element in the form of a SIM that can be "reprogrammed" over-the-air. However, as different MNOs often use different authentication algorithms for the SIM attachment process it is generally not sufficient to simply download new subscription credentials to the SIM. Rather, the SIM has to be provided over-the-air with a new complete subscription profile, including subscription credentials, applications and/or at least parts of a SIM operating system. Methods providing for this possibility are not known from the prior art or at best rather cumbersome.

In light of the above, the problem addressed by the present invention is to provide for methods and devices that allow providing the secure element of a mobile terminal over-the-air with a subscription profile.

SUMMARY OF THE INVENTION

The above object is achieved according to the present invention by the subject-matter of the independent claims. Preferred embodiments of the invention are defined in the dependent claims.

According to a first aspect the invention relates to a method of providing a secure element of a mobile terminal with a subscription profile. The mobile terminal is configured to communicate with a cellular communications network and the subscription profile comprises a network specific portion related to the cellular communications network or a different cellular communications network as well as a hardware specific portion related to the hardware of the mobile terminal and/or the secure element. The method comprises the steps of: assembling the subscription profile, wherein the network specific portion of the subscription profile is provided by a first server and the hardware specific portion of the subscription profile is provided by a second server; and providing the subscription profile over-the-air to the secure element.

As used herein, a "subscription profile" (or short "subscription") can comprise at least parts of a secure element operating system, one or more applications, files and/or data, such as subscription credentials. A "subscription profile" according to the present invention comprises, in particular, a hardware specific portion, i.e. components of the subscription profile that are related to the hardware of the mobile terminal and/or the secure element, and a network specific portion, i.e. components of the subscription profile that are related to the details of the cellular communications network (or a different cellular communications network associated with the subscription profile).

As used herein, the expression "providing a secure element of a mobile terminal with a subscription profile" comprises the complete exchange of an old subscription profile with a new subscription profile, the addition of a new subscription profile besides an already existing subscription profile as well as a partial exchange of an existing subscription profile which may be an update of the existing subscription profile.

Preferably, the method comprises prior to the step of assembling the subscription profile the additional step of identifying the secure element by means of an identification element $ID_{se}$ for determining a configuration key $K_{conf}$ and a secure element key $K_{se}$ associated with the secure element.

According to preferred embodiments of the invention, the step of identifying the secure element comprises the steps of: transmitting the identification element $ID_{se}$ from the secure element to the first server; forwarding the identification element $ID_{se}$ of the secure element to the second server; and transmitting the configuration key $K_{conf}$ determined on the basis of the identification element $ID_{se}$ from the second server to the first server.

Preferably, the identification element $ID_{se}$ is transmitted from the secure element to the first server by means of a message including the identification element $ID_{se}$ in the clear and an encrypted version of the identification element $ID_{se}$ encrypted by using a configuration key $K_{conf}$ stored on the secure element.

According to preferred embodiments of the invention, the message transmitted from the secure element to the first server further comprises an encrypted version of a session key $K_{ses}$ created by the secure element and an encrypted version of a hardware configuration $HW_{conf}$ of the secure element and/or the mobile terminal both encrypted using the configuration key $K_{conf}$.

Preferably, the first server decrypts the encrypted version of the identification element $ID_{se}$, the encrypted version of the session key $K_{ses}$ and the encrypted version of the hardware configuration $HW_{conf}$ of the secure element and/or the mobile terminal using the configuration key $K_{conf}$ provided by the second server so that the first server can verify the validity of the configuration key $K_{conf}$ provided by the second server by verifying that the identification element $ID_{se}$ sent in the clear is identical to the identification element $ID_{se}$ resulting from the decryption of the encrypted version of the identification element $ID_{se}$ using the configuration key $K_{conf}$.

Preferably, the hardware configuration $HW_{conf}$ of the secure element and/or the mobile terminal is determined on the fly by a subscription management application being executed on the secure element and/or the mobile terminal or retrieved from a memory unit of the secure element and/or a memory unit of the mobile terminal.

According to preferred embodiments of the invention, the second server transmits the configuration key $K_{conf}$ determined on the basis of the identification element $ID_{se}$ to the first server only after the first server has successfully authenticated itself vis-à-vis the second server or a mutual authentication between the first server and the second server.

Preferably, the step of assembling the subscription profile comprises the steps of encrypting the hardware specific portion of the subscription profile by the second server using the secure element key $K_{se}$ and encrypting the network specific portion of the subscription profile by the first server using the configuration key $K_{conf}$.

According to preferred embodiment of the invention, the method further comprises the step of encrypting the encrypted hardware specific portion of the subscription profile and the encrypted network specific portion of the subscription profile using a session key $K_{ses}$ created by the secure element.

Preferably, the step of assembling the subscription profile comprises the additional step of determining at least one subscription profile being compatible with a hardware configuration $HW_{conf}$ of the secure element and/or the mobile terminal.

According to preferred embodiments of the invention, the hardware specific portion of the subscription profile comprises at least parts of an operating system OS for the secure element and/or the network specific portion of the subscription profile comprises subscription credentials CREDS, preferably including an IMSI and/or an authentication key $K_i$, for attaching the secure element to the cellular communications network or a different cellular communications network associated with the subscription profile.

According to a second aspect the invention provides for a secure element comprising a subscription profile provided to the secure element by the method according to the first aspect of the invention.

Preferably, the secure element is a subscriber identity module (SIM) for authentication/identification of a subscriber in the cellular communications network. Such a SIM communicates with the mobile terminal via a card reader therein and can be removed in principle from the mobile terminal to be either replaced by a different SIM and/or used in a different mobile terminal. Alternatively, the secure element is an integral part of the mobile terminal such as a hard-wired chip module. Such embedded secure elements are known, for instance, as embedded Universal Integrated Circuit Cards (eUICCs). Preferably, the secure element supports storage of multiple subscription profiles which may be associated with different MNOs. Generally, only one subscription profile is active at a time.

According to a third aspect the invention provides for a mobile terminal containing a secure element according to the second aspect of the invention.

The mobile terminal according to the present invention comprises means for communicating with a cellular communications network, in order to receive a new subscription profile. Preferably, the mobile terminal is implemented in form of a smart phone, a tablet PC, a notebook, a PDA, or the like. Alternatively the mobile terminal can be a multimedia device such as digital picture frame, audio equipment, a TV system, a set top box, an e-book reader and so on. By way of example, the term "mobile terminal" also includes any kind of machinery, like vending machines, vehicles, smart-meters and the like that are configured to communicate via a cellular communications system.

According to a fourth aspect the invention provides for a subscription management backend system, comprising a first server and a second server, wherein the first server and the second server are configured to provide a secure element of a mobile terminal with a subscription profile by means of the method according to the first aspect of the invention.

As generally the hardware related portion of a subscription profile is available to the manufacturer and/or vendor of the mobile terminal and/or the secure element, whereas the network related portion is available to the MNO of the cellular communications network, preferably the second server providing for the hardware related portion of the subscription profile is operated by the manufacturer and/or vendor of the mobile terminal and/or the secure element and the first server providing for the network related portion of the subscription profile is operated by the MNO of the cellular communications network (or a different cellular communications network associated with the subscription profile). Alternatively, the first server could be operated by a subscription management provider serving a number of different MNOs operating different cellular communications networks These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention. In particular, the person skilled in the art will appreciate that the above described preferred embodiments can be implemented in the context of the different aspects of the invention.

DETAILED DESCRIPTION OF PREFERRED EMBODIMENTS

Figure 1:
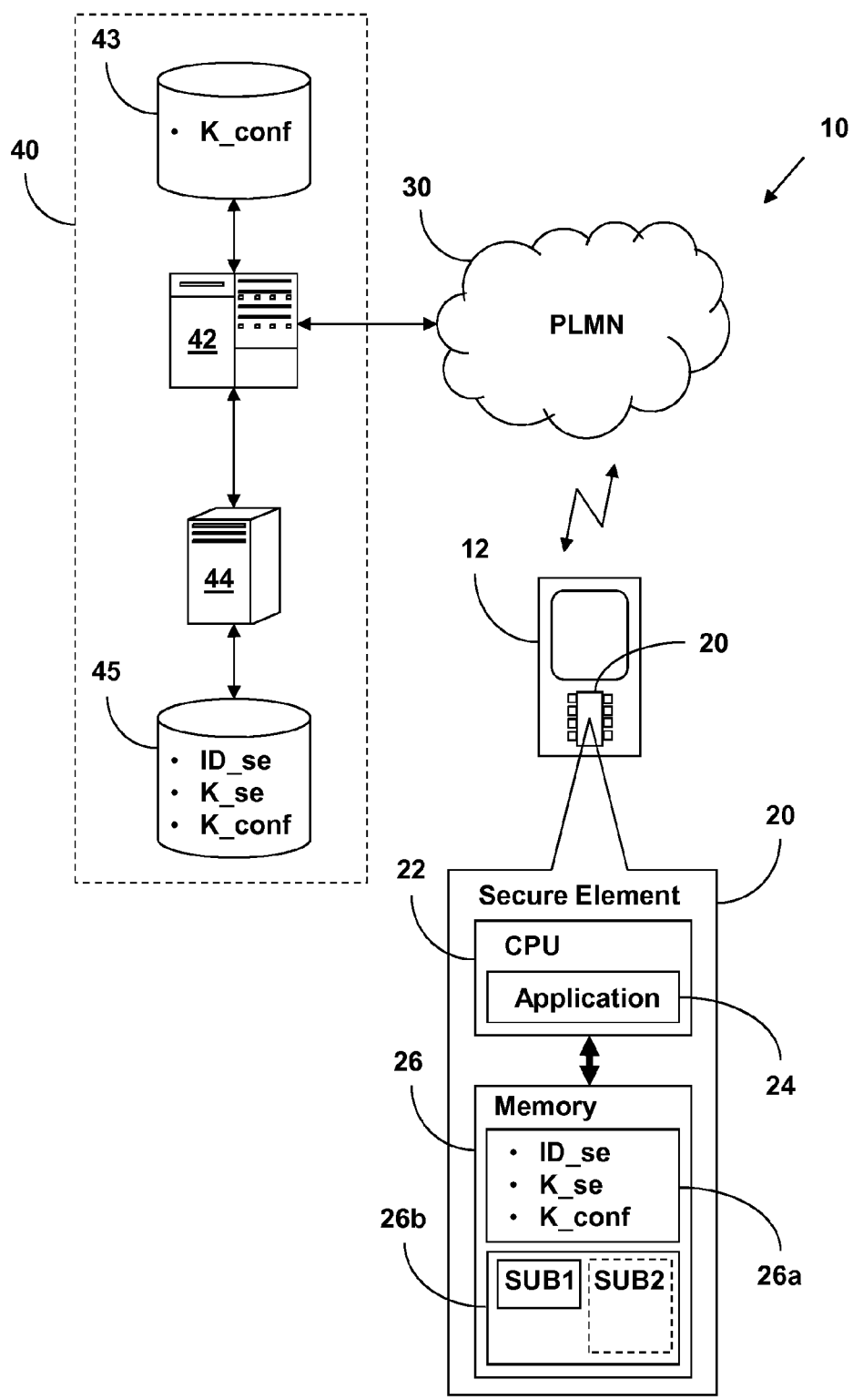
FIG. 1 shows a schematic overview of a communications system illustrating different aspects of the present invention.

FIG. 1 shows schematically the components of a communications system 10 as well as some of the communication channels or links between the components of this system 10 that illustrate different aspects of the present invention. Although the below detailed description will refer to a "mobile" terminal, the person skilled in the art will appreciate that the present invention can be advantageously implemented in the context of any kind of terminals that are configured to communicate via a mobile or cellular communications network. In other words, the attribute "mobile" used herein refers to the ability of the terminal to communicate via a mobile or cellular communications network, also including IP based mobile communication networks.

An exemplary mobile terminal 12 is shown in FIG. 1 including a secure element 20 for securely storing and processing data that uniquely identifies the mobile terminal 12 and/or its user. As indicated in FIG. 1, the mobile terminal 12 preferably is a mobile phone, smart phone or a similar device. The person skilled in the art will appreciate, however, that the mobile terminal 12 according to the present invention can be implemented in the form of other devices as well, such as a tablet or notebook computer, a TV system, a set top box, a vending machine, a vehicle, a surveillance camera, a sensor device and the like. The communications system 10 shown in FIG. 1, moreover, comprises a first server 42 and a second server 44 that are part of a subscription management backend system 40 for providing the secure element 20 of the mobile terminal 12 with a subscription profile. As will be described in more detail further below, the first server 42 (herein referred to as a subscription management server 42) and the second server 44 (herein referred to as a subscription provisioning server 44) of the subscription management backend system 40 could be operated by a single entity or by two different entities, for instance by a mobile network operator (MNO) and a manufacturer/vendor of the mobile terminal 12 and/or the secure element 20.

According to preferred embodiments of the invention the secure element 20 is configured as an eUICC or UICC with a SIM application running thereon, i.e. a secure element that can be mounted in the mobile terminal 12 and used in cellular communications systems for unique and secure subscriber identification as well as for the provision of different special functions and value-added services. Alternatively, the secure element 20 could be configured as a subscriber identity module (SIM), the SIM currently being the most popular type of secure element. The person skilled in the art will appreciate, however, that other types of secure elements that, depending on the underlying generation and type of cellular communications system standard, are designated as USIM, R-UIM, ISIM and the like, are also encompassed by the present invention.

As already mentioned above, the mobile terminal 12 is configured to communicate via the air interface (or radio link) with a cellular communications network or public land mobile network (PLMN) 30, preferably operated by a mobile network operator (MNO) according to the GSM standard, as well as other mobile terminals connected therewith. In the following, preferred embodiments of the invention will be described in the context of a cellular communications network according to the standards of the Global System for Mobile communication (GSM), as specified in a number of specifications provided by ETSI. However, the person skilled in the art will appreciate that the present invention may be advantageously applied in connection with other cellular communications systems as well. Such systems include third-generation cellular communications systems (3GPP), such as the Universal Mobile Telecommunications System (UMTS), and next generation or fourth-generation mobile networks (4G), such as Long Term Evolution (LTE), as well as other cellular communications systems, such as CDMA, GPRS (General Packet Radio Service) and the like.

As is well known to the person skilled in the art, a PLMN configured according to the GSM standard generally comprises a base station subsystem consisting of one or more base transceiver stations that define respective cells of the PLMN and are connected to a base station controller. Generally, the base station controller is one of several base station controllers that communicate with a mobile switching center (MSC). Often, a local database called Visitor Location Register (VLR) for keeping track of the mobile users currently located within the cells covered by a MSC (i.e. the MSC service area) is incorporated in the MSC. The MSC provides essentially the same functionality as a central office switch in a public-switched telephone network and is additionally responsible for call processing, mobility management, and radio resource management. The MSC is further in communication with a home location register (HLR), which is the primary database of the PLMN that stores information about its mobile users required for authentication. To this end, the HLR generally is in communication with an authentication center (AUC). The person skilled in the art will appreciate that although the above described components of a conventional GSM system may have different names in different or consecutive standards for mobile communications networks, the underlying principles used therein are substantially similar and, therefore, compatible with the present invention.

As is known to the person skilled in the art, the communication means between the above mentioned components of the PLMN may be proprietary or may use open standards. The protocols may be SS7 or IP-based. SS7 is a global standard for telecommunications defined by the International Telecommunication Union (ITU) Telecommunication Standardization Sector (ITU-T). The standard defines the procedures and the protocol by which network elements in the public switched telephone network (PSTN) exchange information over a digital signaling network to effect wireless (cellular) and wired call setup, routing and control. The SS7 network and protocol are used for e.g. basic call setup, management, wireless services, wireless roaming, and mobile subscriber authentication, i.e. enhanced call features providing for efficient and secure worldwide telecommunications. How the network elements are grouped or left separate and the interfaces—whether proprietary or open—between these elements are left to the MNO.

As can be taken from the enlarged view of the secure element 20 in FIG. 1, the secure element 20 preferably comprises a central processing unit (CPU) 22. Preferably, the CPU 22 is configured such that at least one application 24 can be executed on the CPU 22 providing for features that will be described in the context of FIG. 2 in more detail further below. The application 24 could be implemented, for instance, as a Java Applet. For providing an execution environment for the application 24 a secure element operating system (not shown in FIG. 1) is preferably being executed on the CPU 22.

Moreover, the secure element 20 preferably comprises a memory unit 26, which preferably is implemented as a non-volatile, rewritable flash memory. Preferably, a first portion 26a of the memory unit 26 is configured to securely store secret data therein. As will be explained in more detail in the context of FIG. 2, this secret data preferably includes an identification element $ID_{se}$ for uniquely identifying the secure element 20. The identification element $ID_{se}$ could be, for instance, the ICCID (integrated circuit card identity) of the secure element 20. Moreover, a secure element key $K_{se}$ and a configuration key $K_{conf}$ are preferably stored in the first portion 26a of the memory unit 26. The identification element $ID_{se}$, the secure element key $K_{se}$ and/or the configuration key $K_{conf}$ can be stored on the secure element 20 during the manufacturing and/or personalization process of the secure element 20. As will be described in more detail further below, the secure element key $K_{se}$ and the configuration key $K_{conf}$ are originally available to the secure element 20 as well as the subscription provisioning server 44 of the subscription management backend system 40.

As can be taken from FIG. 1, moreover, a first subscription profile SUB1 is stored in the memory unit 26 of the secure element 20, for instance in a second portion 26b thereof. This first subscription profile SUB1 can comprise at least parts of an operating system of the secure element 20, one or more applications, such as a PLMN access application containing a MNO specific authentication algorithm, files and/or data, such as subscription credentials that allow the secure element 20 and the mobile terminal 12 to attach to the PLMN 30. Preferably, also at least parts of the second portion 26b of the memory unit 26 of the secure element 20 are configured to securely store the data therein, for instance any subscription credentials to be kept secret, such as an International Mobile Subscriber Identity (IMSI) and/or an authentication key $K_i$, that are part of the first subscription profile SUB1. As indicated in FIG. 1, the second portion 26b of the memory unit 26 preferably provides several "slots" for accommodating additional subscription profiles, such as a second subscription profile SUB2 to be provided by the subscription management backend system 40 according to the process shown in FIG. 2 and described in more detail further below. In other words, the secure element 20 preferably supports storage of multiple subscription profiles. These multiple subscription profiles may be associated with one MNO or different MNOs.

Preferably, the first subscription profile SUB1 can be stored in the memory unit 26 of the secure element 20 during the manufacturing and/or personalization process of the mobile terminal 12 and/or its secure element 20. Especially in this preferred embodiment it is conceivable that the first subscription profile SUB1 is merely a provisional subscription profile only providing for basic services that allow the secure element 20 and mobile terminal 12 to communicate with the subscription management backend system 40 and to download a more complete subscription profile providing for additional services, such as the second subscription profile SUB2 shown in FIG. 1. As a provisional subscription profile, such as the first subscription profile SUB1 shown in FIG. 1, generally provides only a limited functionality, the user of the mobile terminal 12 generally will be enticed to change to a more complete subscription profile providing for additional services, such as the second subscription profile SUB2 shown in FIG. 1.

As shown in FIG. 1 and as already mentioned above, the mobile terminal 12 can communicate via the PLMN 30 with the subscription management server 42 and the subscription provisioning server 44 that are part of the subscription management backend system 40. A first database 43 could be in communication with the subscription management server 42 or implemented thereon. A second database 45 could be in communication with the subscription provisioning server 44 or implemented thereon. Although the secure element 20 and the mobile terminal 12 communicate preferably via the PLMN 30 with the subscription management server 42 and/or the subscription provisioning server 44, the person skilled in the art will appreciate that this communication can happen over a different communication channel as well, such as a LAN, WLAN or WiFi network connected to the Internet. The person skilled in the art will appreciate that communicating via these different communication channels and transferring data from the subscription management server 42 and/or the subscription provisioning server 44 to the secure element 20 might require some special technical solutions, which, however, are not the subject of the present invention.

The functioning of the subscription management server 42 and the subscription provisioning server 44 of the subscription management backend system 40 in combination with the other elements of the communications system 10 shown in FIG. 1 will now be described under further reference to FIG. 2.

Figure 2:
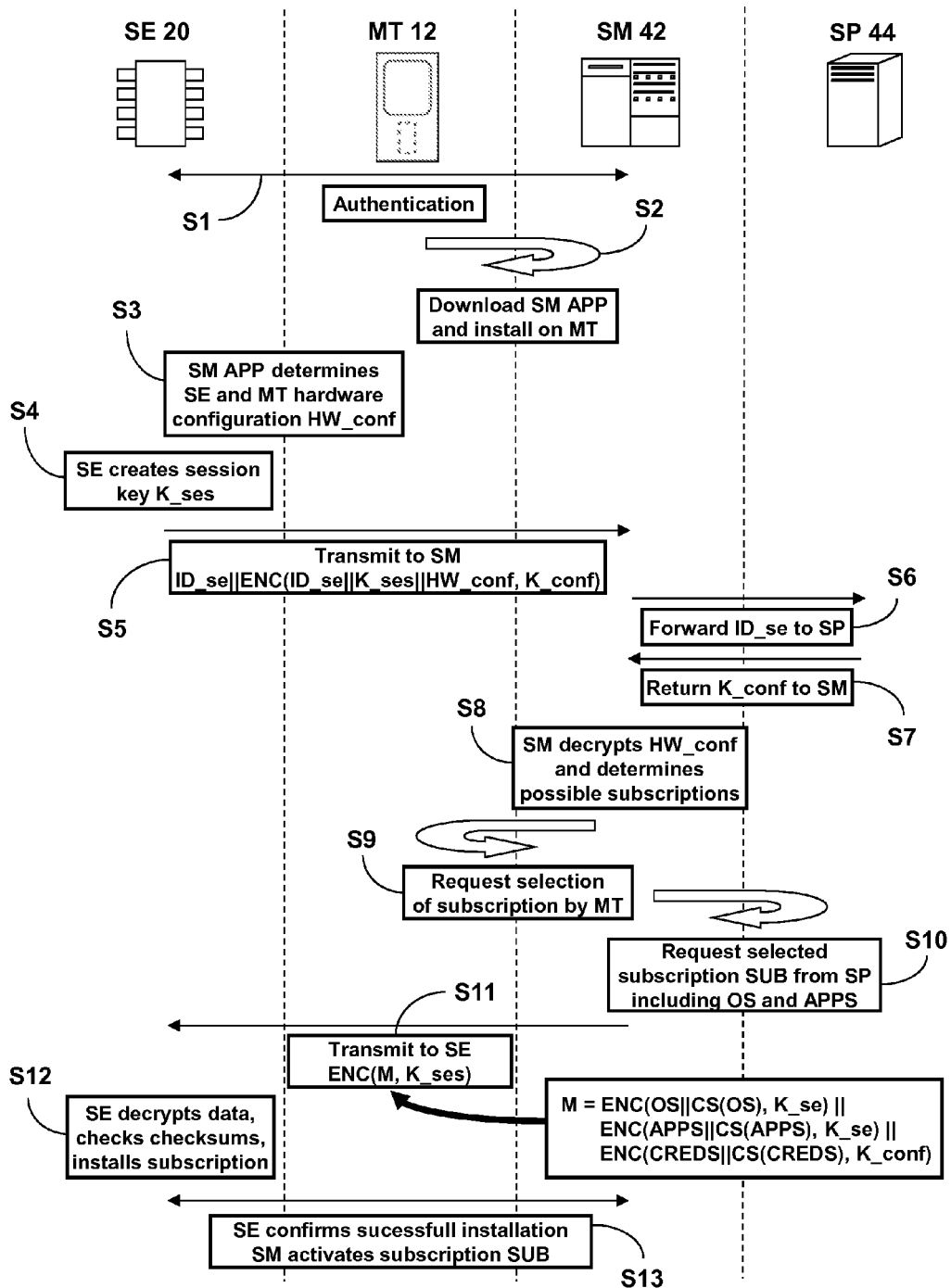
FIG. 2 shows a diagram illustrating a method for providing a subscription profile to the secure element of a mobile terminal according to a preferred embodiment of the invention.

In step S1 of FIG. 2, which could be triggered by the secure element 20 requesting a new subscription profile from the subscription management backend system 40, the secure element 20 authenticates itself vis-à-vis the subscription management server 42 of the subscription management backend system 40. This authentication could be carried out via the PLMN 30, for instance, by using services provided by the PLMN 30 or alternatively by using the PLMN 30 simply as a means for transporting authentication credentials. The person skilled in the art will appreciate, however, that the authentication can be done over a different communications network as well, such as a LAN, WLAN or WiFi network connected to the Internet. According to one embodiment of the present invention it is conceivable that the secure element 20 authenticates itself vis-à-vis the subscription management server 42 by using the subscription credentials of the exemplary provisional subscription profile SUB1 for attaching the secure element 20 to the PLMN 30 that are securely stored within the memory unit 26 of the secure element 20. By means of the authentication step S1 of FIG. 2 the secure element 20 proves to the subscription management server 42 that it is allowed to download a subscription profile. As used herein "downloading a subscription profile" can have the meaning of a complete exchange of an old subscription profile with a new subscription profile, the addition of a new subscription profile besides an already existing subscription profile as well as a partial exchange of an existing subscription profile with a new version of the existing subscription profile.

After a successful authentication of the secure element 12, for instance by means of the subscription credentials of the provisional subscription profile SUB1, a subscription management application (referred to in FIG. 2 as "SM APP") can be downloaded in step S2 of FIG. 2 from the subscription management server 42 to the mobile terminal 12. Preferably, the subscription management application SM APP can run on the mobile terminal 12. Additionally or alternatively, the subscription management application SM APP can be executed on the secure element 20 as well. As the person skilled in the art will appreciate, step S2 of FIG. 2 could be omitted, for instance, if the subscription management application SM APP has been already downloaded and installed on the mobile terminal 12 and/or the secure element 20 during a previous subscription profile download/update session.

Preferably, the subscription management application SM APP downloaded in step S2 of FIG. 2 coordinates the subscription profile update according to the present invention. More specifically, in case the subscription management application SM APP is being executed on the mobile terminal 12, it preferably provides on the one hand access to the subscription management server 42 and on the other hand an interface to the secure element 20 for providing the secure element 20 with a new or updated subscription profile.

Once the subscription management application SM APP has been installed and is being executed on the mobile terminal 12 and/or the secure element 20, the subscription management application SM APP determines in step S3 of FIG. 2 information about the hardware configuration $HW_{conf}$ of the mobile terminal 12 and/or its secure element 20, such as the type of the central processing unit (CPU) of the secure element 20 and/or the mobile terminal 12, the amount of free and used memory available on the secure element 20 and the like. According to the present invention it is conceivable that at least some information about the hardware configuration $HW_{conf}$ of the secure element 20 and/or the mobile terminal 12 is already stored in the memory unit 26 of the secure element 20 and/or in a memory unit of the mobile terminal 12 and can be retrieved therefrom by the subscription management application SM APP. Alternatively or additionally, at least parts of the hardware configuration $HW_{conf}$ can be determined on-the-fly by the subscription management application SM APP running on the secure element 20 and/or the mobile terminal 12. As will described in more detail further below, on the basis of the hardware configuration $HW_{conf}$ of the secure element 20 and/or the mobile terminal 12 only those subscription profiles will be offered to the user of the mobile terminal 12 for downloading which are compatible with the hardware configuration $HW_{conf}$ as determined by the subscription management application SM APP in step S3 of FIG. 2.

In step S4 of FIG. 2, the secure element 20 creates a temporary session key $K_{ses}$ for securing certain steps of the preferred subscription profile update session shown in FIG. 2. Preferably, the session key $K_{ses}$ is a nonce, i.e. an arbitrary number used only once. This ensures that for every subscription profile update session, such as the subscription profile update session shown in FIG. 2, a different session key $K_{ses}$ is used. As is well known to the person skilled in the art, such a nonce can be created, for instance, by using a pseudorandom number generator, preferably a cryptographically secure pseudorandom number generator.

In step S5 of FIG. 2 the identification element $ID_{se}$ of the secure element 20 stored within the first portion 26a of the memory 26 of the secure element 20 is send preferably together with the hardware configuration $HW_{conf}$ determined in step S3 and the session key $K_{ses}$ created in step S4 of FIG. 2 to the subscription management server 42. To this end, these data elements are preferably concatenated and the resulting data string is encrypted using the configuration key $K_{conf}$ resulting in the encrypted message $C = ENC(ID_{se}\|K_{ses}\|HW_{conf}, K_{conf})$ where the symbol $\|$ denotes the concatenation operation and $ENC(\ldots, K_{conf})$ denotes an encryption operation using the configuration key $K_{conf}$. Preferably, the encrypted message C, in turn, is concatenated with the identification element $ID_{se}$ of the secure element 20 resulting in the message $ID\text{-}_{se}\|ENC(ID_{se}\|K_{ses}\|HW_{conf}, K_{conf})$. Preferably, this message containing the identification element $ID_{se}$ in the clear and the encrypted message C is send to the subscription management server 42 in step S5 of FIG. 2. As the person skilled in the art will appreciate, the identification element $ID_{se}$ can be retrieved from this message by any recipient thereof, whereas the remaining parts thereof can only be read by a recipient in possession of the configuration key $K_{conf}$.

As the person skilled in the art will appreciate, the order of the elements in concatenating the identification element $ID_{se}$, the hardware configuration $HW_{conf}$ and the session key $K_{ses}$ is a matter of choice and, thus, not critical with respect to the present invention, as long as the sender and receiver have agreed on the same order. For encrypting the data string resulting from the concatenation of the identification element $ID_{se}$, the hardware configuration $HW_{conf}$ and the session key $K_{ses}$ any symmetric encryption algorithm can be employed using the configuration key $K_{conf}$, such as AES, DES, 3DES, or the like.

Having received the message sent by the secure element 20 in step S5 of FIG. 2, the subscription management server 42 extracts the identification element $ID_{se}$ therefrom, which, as outlined above, has been sent in the clear. Based on this identification element $ID_{se}$ of the secure element 20 the subscription management server 42 can determine one or more appropriate subscription provisioning servers, for instance the subscription provisioning server 44, that have access, in particular, to hardware specific data about the secure element 20 and/or the mobile terminal 12 being associated with the identification element $ID_{se}$ of the secure element 20. Having determined at least one such appropriate subscription provisioning server, e.g. the subscription provisioning server 44 shown in FIG. 1, the subscription management server 42 preferably forwards the identification element $ID_{se}$ of the secure element 20 to the subscription provisioning server 44. Preferably, the subscription provisioning server 44 is operated by the vendor and/or manufacturer of the mobile terminal 12 and/or the secure element 20 and has access to hardware specific data, i.e. data associated with the hardware configuration of the mobile terminal 12 and/or the secure element 20.

In order to determine an appropriate subscription provisioning server, a database, such as the database 43 shown in FIG. 1, could be in communication with the subscription management server 42 or implemented thereon, wherein a multitude of different identification elements of secure elements, such as the identification element $ID_{se}$ of the secure element 20, are linked to one or more appropriate subscription provisioning servers, respectively. These one or more appropriate subscription provisioning servers, such as the subscription provisioning server 44 shown in FIG. 1, could be identified, for instance, by an IP address, a URL or the like.

Having received the identification element $ID_{se}$ of the secure element 20 in step S6 of FIG. 2, the subscription provisioning server 44 in step S7 of FIG. 2 returns the configuration key $K_{conf}$ associated with the identification element $ID_{se}$ of the secure element 20 to the subscription management server 42. To retrieve this configuration key $K_{conf}$ the subscription provisioning server 44 could access the database 45, wherein a multitude of configuration keys, such as the configuration key $K_{conf}$, are stored in connection with a plurality of secure element identification elements, such as the identification element $ID_{se}$ of the secure element 20. As already mentioned above, the database 45 could be hosted on a different server or implemented on the subscription provisioning server 44 itself.

Preferably, the subscription provisioning server 44 provides the subscription management server 42 with the configuration key $K_{conf}$ only in case the subscription provisioning server 44 can trust the subscription management server 42. To this end, according to preferred embodiments of the invention, in particular, when the subscription provisioning server 44 and the subscription management server 42 are operated by different entities, the subscription management server 42 has to authenticate itself vis-à-vis the subscription provisioning server 44 before the configuration key $K_{conf}$ is provided to the subscription management server 42 in step S7 of FIG. 2.

Using the configuration key $K_{conf}$ received from the subscription provisioning server 44 in step S7 of FIG. 2 the subscription management server 42 decrypts in step S8 of FIG. 2 the part of the message sent by the secure element 20 in step S5 of FIG. 2 that has been encrypted using the configuration key $K_{conf}$. In doing so, the subscription management server 42 preferably retrieves once more the identification element $ID_{se}$ of the secure element 20, the session key $K_{ses}$ as well as the hardware configuration $HW_{conf}$ of the secure element 20 and/or the mobile terminal 12. By comparing the identification element $ID_{se}$ obtained by decrypting the message provided by the secure element 20 in step S5 of FIG. 2 with the identification element $ID_{se}$ that has been transmitted in the clear as part of that message, the subscription management server 42 can verify that the configuration key $K_{conf}$ provided by the subscription provisioning server 44 is correct, i.e. identical with the configuration key $K_{conf}$ used by the secure element 20 to encrypt the message sent in step S5 of FIG. 2. In case of any discrepancy the subscription management server 42 could ask the secure element 20 to retransmit the message sent in step S5 of FIG. 2 and/or the subscription provisioning server 44 to check the configuration key $K_{conf}$ provided in step S7 of FIG. 2.

In step S8 of FIG. 2 the subscription management server 42, furthermore, determines on the basis of the hardware configuration $HW_{conf}$ of the secure element 20 and/or the mobile terminal 12 the subscription profiles that are compatible with the hardware configuration thereof and creates a list of corresponding subscription profiles available to the secure element 20 and/or the mobile terminal 12. Thereafter, this list is forwarded in step S9 of FIG. 2 to the mobile terminal 12 and, for instance, displayed on the screen of the mobile terminal 12 prompting the mobile user to select one of the available subscription profiles. The list of selectable subscription profiles could comprise for each selectable subscription profile additional information, such as the monthly costs, additional services and the like of a respective subscription profile.

Once the user of the mobile terminal 12 has selected one of the available subscription profiles, for instance, via a touchpad of his mobile terminal 12, the subscription management server 42 is informed about the selected subscription profile (referred to in FIG. 2 as subscription profile SUB), which, in turn, forwards this information to the subscription provisioning server 44. Thus, both the subscription management server 42 and the subscription provisioning server 44 are informed about the subscription profile SUB selected by the user of the mobile terminal 12.

According to the present invention the selected subscription profile SUB generally includes a hardware specific portion as well as a cellular communications network specific portion. The hardware specific portion of the subscription profile SUB refers to any components of the subscription profile that are related to the hardware of the mobile terminal 12 and/or the secure element 20 and preferably comprises at least parts of a secure element operating system (referred to as operating system OS in FIG. 2) and/or one or more applications (referred to as applications APPS in FIG. 2) that depend upon the hardware configuration $HW_{conf}$ of the secure element 20 and/or the operating system OS thereof. The network specific portion of the subscription profile SUB refers to any components of the subscription profile that are related to the details of the PLMN 30 (or a different PLMN associated with the subscription profile SUB) and preferably comprises subscription credentials (referred to in FIG. 2 as subscription credentials CREDS), such as an International Mobile Subscriber Identity (IMSI) and/or an authentication key $K_i$. The person skilled in the art will appreciate that also the network specific portion of the subscription profile SUB can include applications, for instance, a PLMN access application containing a MNO specific authentication algorithm.

As generally the hardware specific data of a subscription profile are available to the manufacturer and/or vendor of the mobile terminal 12 and/or the secure element 20, whereas the network related data are available to the MNO of the PLMN 30 (or a different PLMN), preferably the subscription provisioning server 44 providing for the hardware specific data is operated by the manufacturer and/or vendor of the mobile terminal 12 and/or the secure element 20 and the subscription management server 42 providing for the network specific data is operated by the MNO of the PLMN 30 (or a new PLMN used by the subscription profile SUB). Alternatively, the subscription management server 42 could be operated by a subscription management provider serving a number of different MNOs.

In step 10 of FIG. 2 the subscription management server 42 requests from the subscription provisioning server 44 the hardware specific portion of the subscription profile SUB selected by the user of the mobile terminal 12 in step S9 of FIG. 2. The subscription provisioning server 44 compiles and preferably encrypts this hardware related data using the secure element key $K_{se}$, comprising in particular at least parts of a secure element operating system OS and/or one or more applications APPS that depend upon the hardware configuration $HW_{conf}$ of the secure element 20 and/or the new operating system OS thereof. According to a preferred embodiment of the invention this data is encrypted together with a respective checksum thereof, resulting preferably in the following encrypted data elements $ENC(OS\|CS(OS), K_{se})$ and $ENC(APPS\|CS(APPS), K_{se})$, wherein $CS(OS)$ and $CS(APPS)$ denote a checksum determined on the basis of the secure element operating system OS and the one or more applications APPS, respectively. The subscription provisioning server 44 returns the encrypted data elements to the subscription management server 42, which cannot decrypt these data elements, as the subscription management server 42 does not have access to the secure element key $K_{se}$ that is shared by the secure element 20 and the subscription provisioning server 44 only. Thus, the subscription management server 42 will not have access to this potentially confidential data.

The subscription management server 42 preferably concatenates the encrypted data elements provided by the subscription provisioning server 44 in step S10 of FIG. 2, i.e. ENC(OS||CS(OS), $K_{se}$) and ENC(APPS||CS(APPS), $K_{se}$), with the network specific portion of the subscription profile SUB provided by the subscription management server 42 or the database 43 in communication therewith. Preferably, this network specific portion of the subscription profile SUB provided by the subscription management server 42 includes subscription credentials (referred to as subscription credentials CREDS in FIG. 2), such as an International Mobile Subscriber Identity (IMSI) and/or an authentication key $K_i$, that allow access to the PLMN 30 or a different PLMN supported by the subscription profile SUB.

Preferably, the subscription management server 42 encrypts the network specific portion of the subscription profile SUB including the subscription credentials CREDS using the configuration key $K_{conf}$ that was received by the subscription management server 42 from the subscription provisioning server 44 in step S7 of FIG. 2 (as well as in originally encrypted form from the secure element 20 in step S5 of FIG. 2). Also in this case it is preferred that the network specific portion of the new subscription profile SUB including the subscription credentials CREDs is encrypted together with a checksum thereof resulting preferably in the following encrypted data element ENC(CREDS||CS(CREDS), $K_{conf}$), wherein CS(CREDS) denotes a checksum determined on the basis of the subscription credentials CREDS.

Preferably, the message M resulting from the concatenation of the encrypted data elements, i.e. ENC(OS||CS(OS), $K_{se}$) and ENC(APPS||CS(APPS), $K_{se}$), provided by the subscription provisioning server 44 in step S10 of FIG. 2 with the encrypted data element created by the subscription management server 42 on the basis of the subscription credentials CREDS, i.e. ENC(CREDS||CS(CREDS), $K_{conf}$), is, in turn, encrypted by the subscription management server 42 using the session key $K_{ses}$, i.e. ENC(M, $K_{ses}$) with M=ENC(OS||CS(OS), $K_{se}$)ENC(APPS||CS(APPS), $K_{se}$) ||ENC(CREDS||CS(CREDS), $K_{conf}$). The session key $K_{ses}$ had been provided to the subscription management server 42 in encrypted form by the secure element 20 in step S5 of FIG. 2 and has been decrypted by the subscription management server 42 in step S8 of FIG. 2 using the configuration key $K_{conf}$ provided by the subscription provisioning server 44 in step S7 of FIG. 2.

In step S11 of FIG. 2 the subscription management server 42 transmits the encrypted version of the message M to the secure element 20 via the mobile terminal 12. Having received the encrypted message M, the secure element 20, in turn, decrypts this message M in step S12 of FIG. 2 using the session key $K_{ses}$ created in step S4 of FIG. 2. From the decrypted message M the secure element 20 extracts the operating system OS, the one or more applications APPS as well as the subscription credentials CREDS of the subscription profile SUB selected by the user of the mobile terminal 12 in step S9 of FIG. 2. For decrypting the hardware specific portion of the subscription profile SUB, i.e. the operating system OS and the one or more applications APPS, the secure element 20 uses the secure element key $K_{se}$, whereas for decrypting the network specific portion of the subscription profile SUB, i.e. the subscription credentials CREDS, the secure element 20 uses the configuration key $K_{conf}$. Moreover, in order to verify the integrity of the data provided by the subscription management server 42 in step S11 of FIG. 2 the secure element 20 checks the respective checksums CS(OS), CS(APPS) and CS(CREDS) determined on the basis of the operating system OS, the one or more applications APPS as well as the subscription credentials CREDS. If it is verified that the data is integer, i.e. has not been modified, the secure element 20 installs and/or stores the same on the memory unit 26 to be available for future use, i.e. for the next attachment to the PLMN 30 or a different PLMN supported by the subscription profile SUB.

Once the subscription profile SUB has been successfully implemented on the secure element 20 in step S12 of FIG. 2, the secure element 20 sends in step S13 of FIG. 2 a confirmation message to the subscription management server 42. Furthermore, in response thereto, the subscription management server 42 preferably provides the secure element 20 with an activation code for activating the subscription profile SUB on the secure element 20. These steps could be coordinated on the side of the mobile terminal 12 by the subscription management application SM APP downloaded in step S2 of FIG. 2 or a similar application running thereon. After the subscription profile SUB has been activated by the secure element 20 using the activation code provided by the subscription management server 42, it is in principle possible to remove any "old" subscription profiles, such as the provisional subscription profile SUB1 shown in FIG. 1, from the memory unit 26 of the secure element 20 to make room for additional subscription profiles.

In case the subscription profile SUB cannot be successfully implemented or activated on the secure element 20, the secure element 20 preferably returns to the provisional subscription profile SUB1 that is still stored on the memory unit 26 and can retry the above described process or specific steps thereof for obtaining a subscription profile via the PLMN 30 and the subscription management backend system 40.

Before or substantially concurrently with activating the subscription profile SUB on the secure element 20 the subscription management server 42 preferably sends a confirmation message to the MNO of the PLMN supported by the subscription profile SUB and, in particular, the subscription credentials CREDS thereof. In response thereto the MNO can activate the subscription credentials CREDS of the subscription profile SUB in its HLR/AUC so that the mobile terminal 12 and its secure element 20 can attach to the PLMN using the subscription credentials CREDS of the subscription profile SUB.

Although it has been described above that one or more applications APPS as part of the new subscription profile SUB are provided by the subscription provisioning server 44, the person skilled in the art will appreciate that the present invention can be advantageously implemented in cases, where such applications as part of the new subscription profile SUB are additionally or alternatively provided by the subscription management server 42, for instance an PLMN access application containing a MNO specific implementation of an authentication algorithm. With respect to the present invention it is merely important that one portion of the subscription profile SUB is provided by the subscription provisioning server 44, namely the hardware specific portion thereof, and that another portion of the subscription profile SUB is provided by the subscription management server 42, namely the network specific portion thereof.

In light of the above detailed description the person skilled in the art will appreciate that modifications and/or additions can be made to the methods, devices and systems as described heretofore, which are to be considered to remain within the scope of the present invention as defined by the appended claims.

The invention claimed is:

1. A method of providing a secure element of a mobile terminal with a subscription profile, wherein the mobile terminal is configured to communicate with a cellular communications network and wherein the subscription profile comprises a network specific portion related to the cellular communications network or a different cellular communications network as well as a hardware specific portion related to the hardware of the secure element and/or the mobile terminal, wherein the method comprises the steps of:
    assembling the subscription profile on a first server, wherein the network specific portion of the subscription profile is provided by the first server and the hardware specific portion of the subscription profile is provided by a second server; and
    providing the assembled subscription profile over-the-air to the secure element.

2. The method of claim 1, wherein prior to the step of assembling the subscription profile, the method comprises the additional step of identifying the secure element by means of an identification element for determining a configuration key and a secure element key associated with the secure element.

3. The method of claim 2, wherein the step of identifying the secure element comprises the steps of:
    transmitting the identification element from the secure element to the first server over-the-air;
    forwarding the identification element of the secure element to the second server; and
    transmitting the configuration key determined on the basis of the identification element from the second server to the first server over-the-air.

4. The method of claim 3, wherein the identification element is transmitted from the secure element to the first server by means of a message including the identification element in the clear and an encrypted version of the identification element encrypted by using the configuration key stored on the secure element.

5. The method of claim 4, wherein the message further comprises an encrypted version of a session key created by the secure element and an encrypted version of a hardware configuration of the secure element and/or the mobile terminal both encrypted using the configuration key.

6. The method of claim 5, wherein the first server decrypts the encrypted version of the identification element, the encrypted version of the session key and the encrypted version of the hardware configuration of the secure element and/or the mobile terminal using the configuration key provided by the second server so that the first server can verify the validity of the configuration key provided by the second server by verifying that the identification element sent in the clear is identical to the identification element resulting from the decryption of the encrypted version of the identification element using the configuration key.

7. The method of claim 5, wherein the hardware configuration of the secure element and/or the mobile terminal is automatically determined by a subscription management application being executed on the secure element and/or the mobile terminal or retrieved from a memory unit of the secure element and/or a memory unit of the mobile terminal.

8. The method of claim 4, wherein the second server transmits the configuration key determined on the basis of the identification element to the first server only after the first server has successfully authenticated itself to the second server.

9. The method of claim 3, wherein the step of assembling the subscription profile comprises the steps of encrypting the hardware specific portion of the subscription profile by the second server using the secure element key and encrypting the network specific portion of the subscription profile by the first server using the configuration key.

10. The method of claim 9, further comprising the step of encrypting the encrypted hardware specific portion of the subscription profile and the encrypted network specific portion of the subscription profile using a session key created by the secure element.

11. The method of claim 1, wherein the step of assembling the subscription profile comprises the additional step of determining at least one subscription profile, including the subscription profile, being compatible with a hardware configuration of the secure element and/or the mobile terminal.

12. The method of claim 1, wherein the hardware specific portion of the subscription profile comprises at least parts of an operating system for the secure element and/or the network specific portion of the subscription profile comprises subscription credentials, including an IMSI and/or an authentication key $K_i$, for attaching the secure element to the cellular communications network or a different cellular communications network.

13. A secure element comprising a subscription profile provided to the secure element by the method according to claim 1.

14. A mobile terminal containing a secure element according to claim 13.

15. A subscription management backend system, comprising a first server and a second server, wherein the first server and the second server are configured to provide a secure element of a mobile terminal with a subscription profile by the method according to claim 1.

16. A method of providing a secure element of a mobile terminal with a subscription profile, wherein the mobile terminal is configured to communicate with a cellular communications network and wherein the subscription profile comprises a network specific portion related to the cellular communications network or a different cellular communications network as well as a hardware specific portion related to the hardware of the secure element and/or the mobile terminal, wherein the method comprises the steps of:
    identifying the secure element by means of an identification element for determining a configuration key and a secure element key associated with the secure element;
    assembling the subscription profile, wherein the network specific portion of the subscription profile is provided by a first server and the hardware specific portion of the subscription profile is provided by a second server; and
    providing the assembled subscription profile over-the-air to the secure element;
wherein the step of identifying the secure element comprises the steps of:
    transmitting the identification element from the secure element to the first server over the cellular communications network;
    forwarding the identification element of the secure element to the second server; and transmitting the configuration key determined on the basis of the identification element from the second server to the first server over the cellular communications network.

* * * * *